(12) United States Patent
Sundareswara et al.

(10) Patent No.: US 11,080,660 B2
(45) Date of Patent: Aug. 3, 2021

(54) DATA-DRIVEN UNSUPERVISED ALGORITHM FOR ANALYZING SENSOR DATA TO DETECT ABNORMAL VALVE OPERATION

(71) Applicant: THE BOEING COMPANY, Chicago, IL (US)

(72) Inventors: Rashmi N. Sundareswara, Topanga, CA (US); Tsai-Ching Lu, Thousand Oaks, CA (US); Franz D. Betz, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 423 days.

(21) Appl. No.: 15/464,044

(22) Filed: Mar. 20, 2017

(65) Prior Publication Data

US 2018/0266584 A1    Sep. 20, 2018

(51) Int. Cl.
*F16K 37/00* (2006.01)
*G05B 23/02* (2006.01)
(Continued)

(52) U.S. Cl.
CPC ....... *G06Q 10/1097* (2013.01); *F01D 21/003* (2013.01); *F16K 37/0075* (2013.01);
(Continued)

(58) Field of Classification Search
None
See application file for complete search history.

(56) References Cited

U.S. PATENT DOCUMENTS 6,386,229 B1 * 5/2002 Morikawa ............. F16K 31/426
137/552
8,378,853 B2 * 2/2013 Smith .................. G06F 11/0739
340/945
(Continued)

FOREIGN PATENT DOCUMENTS

CA    2999813 A1 * 3/2017 ............... F02D 9/02
EP    3043097 A1    7/2016
(Continued)

OTHER PUBLICATIONS

Arthur, David, et al: "K-means++: The Advantages of Careful Seeding", SODA '07: Proceedings of the Eighteenth Annual ACM-SIAM Symposium on Discrete Algorithms, 2007, pp. 1027-1035.
(Continued)

*Primary Examiner* — Catherine T. Rastovski
*Assistant Examiner* — Leonard S Liang
(74) *Attorney, Agent, or Firm* — Patterson + Sheridan, LLP

(57) ABSTRACT

A computer-implemented method, system, and computer program product are provided. A plurality of maintenance messages (MMSGs) are identified. Each MMSG is associated with at least one shut-off valve. A sensor parameter is identified based on an analysis of sensor parameters associated with the shut-off valves of each MMSG. A threshold value for the sensor parameter is identified as being associated with abnormal operation of the respective shut-off valves. A sensor associated with a first shut-off valve captures values for the sensor parameter during a first and second predefined time period, the first and second predefined time periods associated with an opening and a closing of the first shut-off valve. Upon determining that a difference between the maximum values of the sensor values captured during the first and second predefined time periods
(Continued)

exceeds the first threshold value, a determination is made that the first shut-off valve is operating abnormally.

20 Claims, 8 Drawing Sheets

(51) Int. Cl.
*G06Q 10/10* (2012.01)
*G06Q 10/00* (2012.01)
*F01D 21/00* (2006.01)
*G01M 99/00* (2011.01)
*G07C 5/08* (2006.01)
*G01M 15/14* (2006.01)
*B64F 5/60* (2017.01)

(52) U.S. Cl.
CPC ...... *F16K 37/0083* (2013.01); *G05B 23/0235* (2013.01); *G06Q 10/20* (2013.01); *B64F 5/60* (2017.01); *F01D 21/00* (2013.01); *F16K 37/0091* (2013.01); *G01M 15/14* (2013.01); *G01M 99/005* (2013.01); *G05B 23/0205* (2013.01); *G05B 23/0218* (2013.01); *G05B 23/0254* (2013.01); *G05B 23/0259* (2013.01); *G07C 5/0808* (2013.01)

(56) References Cited

U.S. PATENT DOCUMENTS

| | | | | |
|---|---|---|---|---|
| 9,037,281 | B2 * | 5/2015 | Pyotsia | F16K 37/0091 |
| | | | | 700/110 |
| 9,546,604 | B2 * | 1/2017 | Clauson | F16K 37/0091 |
| 9,724,979 | B1 * | 8/2017 | Thumati | B64D 13/06 |
| 9,915,375 | B1 * | 3/2018 | Anderson | F16K 37/0083 |
| 10,703,464 | B2 * | 7/2020 | Georgin | B60T 8/1703 |
| 10,934,886 | B2 * | 3/2021 | Widemann | F01D 19/00 |
| 2005/0267709 | A1 * | 12/2005 | Heavner, III | G05B 23/0235 |
| | | | | 702/183 |
| 2005/0267710 | A1 * | 12/2005 | Heavner, III | G05B 23/024 |
| | | | | 702/183 |
| 2006/0174707 | A1 * | 8/2006 | Zhang | G01M 3/243 |
| | | | | 73/592 |
| 2009/0055130 | A1 * | 2/2009 | Pandey | G05B 23/0254 |
| | | | | 702/183 |
| 2009/0094076 | A1 * | 4/2009 | Reddy | G06Q 10/04 |
| | | | | 705/7.41 |
| 2009/0222124 | A1 * | 9/2009 | Latwesen | G05B 23/0235 |
| | | | | 700/110 |
| 2010/0023201 | A1 * | 1/2010 | Kinney | G05B 23/0264 |
| | | | | 701/31.4 |
| 2010/0090058 | A1 | 4/2010 | Cahill et al. | |
| 2010/0257029 | A1 * | 10/2010 | Nielsen | G01V 3/08 |
| | | | | 340/686.1 |
| 2010/0262470 | A1 * | 10/2010 | Nielsen | G06Q 10/06 |
| | | | | 427/136 |
| 2011/0125348 | A1 * | 5/2011 | Sandell | G07C 5/008 |
| | | | | 701/14 |
| 2011/0160917 | A1 | 6/2011 | Snowbarger | |
| 2011/0256000 | A1 * | 10/2011 | Fukui | B64C 13/505 |
| | | | | 417/213 |
| 2012/0025015 | A1 * | 2/2012 | Ito | B64C 13/42 |
| | | | | 244/99.6 |
| 2012/0209568 | A1 * | 8/2012 | Arndt | G06F 11/008 |
| | | | | 702/183 |
| 2012/0290261 | A1 * | 11/2012 | Genta | G05B 23/00 |
| | | | | 702/179 |
| 2013/0124018 | A1 * | 5/2013 | Lentz | G05D 1/00 |
| | | | | 701/3 |
| 2013/0197739 | A1 * | 8/2013 | Gallagher | B64F 5/60 |
| | | | | 701/31.5 |
| 2013/0226395 | A1 * | 8/2013 | Sense | F16K 37/0083 |
| | | | | 701/32.9 |
| 2014/0182381 | A1 * | 7/2014 | Comeaux | G01N 29/12 |
| | | | | 73/587 |
| 2014/0309846 | A1 * | 10/2014 | Howard | F02C 6/08 |
| | | | | 701/31.9 |
| 2015/0032270 | A1 * | 1/2015 | Gattu | F15B 19/005 |
| | | | | 700/282 |
| 2016/0144983 | A1 * | 5/2016 | Thuong | G01M 17/00 |
| | | | | 701/31.7 |
| 2016/0186890 | A1 * | 6/2016 | Sense | G05B 23/0229 |
| | | | | 137/557 |
| 2016/0314632 | A1 * | 10/2016 | Lu | B64D 45/00 |
| 2016/0327181 | A1 * | 11/2016 | Schoonover | G01L 27/005 |
| 2017/0052836 | A1 * | 2/2017 | Horabin | G05B 23/0235 |
| 2017/0061295 | A1 * | 3/2017 | Horabin | B64D 13/08 |
| 2017/0167631 | A1 * | 6/2017 | Bush | G01F 1/00 |
| 2017/0208755 | A1 * | 7/2017 | Kaminski | A01G 25/167 |
| 2017/0243413 | A1 * | 8/2017 | Haggerty | G07C 5/0841 |
| 2017/0268462 | A1 * | 9/2017 | Smiddy | F01N 3/10 |
| 2017/0321570 | A1 * | 11/2017 | Scothern | F02C 9/18 |
| 2017/0322120 | A1 * | 11/2017 | Wang | G01M 99/008 |
| 2017/0344897 | A1 * | 11/2017 | Alam | G06F 17/11 |
| 2018/0172556 | A1 * | 6/2018 | Patanian | G05B 23/0283 |
| 2019/0079815 | A1 * | 3/2019 | Cader | G06F 1/206 |

FOREIGN PATENT DOCUMENTS

| | | | |
|---|---|---|---|
| JP | 2015114943 A | * | 6/2015 |
| JP | 6564544 B1 | * | 8/2019 |

OTHER PUBLICATIONS

Byington, C. S., et al.: "Dynamic Signal Analysis and Neural Network Modeling for Life Prediction of Flight Control Actuators" Proceedings of the American Helicopter Society 60th Annual Forum. Baltimore, MD, 2004, AHS.

Furse, Cynthia, et al: "Noise-Domain Reflectometry for Locating Wiring Faults", IEEE Transactions on Electromagnetic Compatibility, IEEE Transactions on Electromagnetic Compatibility, vol. 47, Issue 1, Feb. 2005.

Ghidella, J., et al.: "Requirements-Based Testing in Aircraft Control Design," Paper ID AIAA 2005-5886 in AIAA Modeling and Simulations Technologies Conference and Exhibit 2005, Aug. 15-18, San Francisco, California, 2005.

Kobayashi, T., et al.: "Application of a Bank of Kalman Filters for Aircraft Engine Fault Diagnostics", Turbo Expo, Atlanta, GA, Jun. 16-19, 2003.

Smith, Paul, et al.: "Analysis of Spread Spectrum Time Domain Reflectometry for Wire Fault Location", IEEE Sensors Journal, Dec. 2005.

Volponi, A. J., et al.: "Development of an Information Fusion System for Engine Diagnostics and Health Management," 39th Combustion/27th Airbreathing Propulsion/21st Propulsion Systems Hazards/Third Modeling and Simulation Joint Subcommittee Meeting, Colorado Springs, CO, Dec. 1-5, 2003. Paper No. NASA/TM2004-212924.

Yan, W., et al.: "Jet engine gas path fault diagnosis using dynamic fusion of multiple classifiers", Proceedings of IEEE World Congress on Computational Intelligence, Jun. 1-8, 2008, Hong Kong, doi: 10.1109/IJCNN.2008.4634008.

Extended European Search Report for Application No. 18155004.7-1204 dated Aug. 16, 2018.

Byington, C. S., et al.: "In-Line Health Monitoring System for Hydraulic Pumps and Motors", Proceedings of the IEEE Aerospace Conference, New York, 2003.

Jon Gertner: "Most Innovative Companies 2014" http://www.fastcompany.com/3025164/ge, Retrieved Dec. 10, 2014.

European Patent Examination Report for Application No. 18 155 004.7-1202 dated Apr. 29, 2020.

* cited by examiner

DATA-DRIVEN UNSUPERVISED ALGORITHM FOR ANALYZING SENSOR DATA TO DETECT ABNORMAL VALVE OPERATION

BACKGROUND

Aspects described herein relate to valves in aircraft, and more specifically, to a method and system for detecting abnormal valve operation based on a data-driven, unsupervised algorithm for analyzing sensor data. Often, abnormal operation of valves in an aircraft is difficult and time consuming to diagnose. Furthermore, conventional approaches are targeted at diagnosing abnormal operation of a specific valve, or type of valve.

SUMMARY

According to one aspect, a computer-implemented method includes identifying a plurality of maintenance messages (MMSGs). Each of the plurality of MMSGs is associated with at least one shut-off valve of a plurality of shut-off valves in a vehicle. The method further includes identifying a first sensor parameter based on an analysis of a plurality of sensor parameters associated with the at least one shut-off valve associated with each MMSG. In addition, a first threshold value for the first sensor parameter is identified as being associated with abnormal operation of the respective at least one shut-off valve. A first sensor associated with a first shut-off valve of the plurality of shut-off valves captures a plurality of values for the first sensor parameter during: (i) a first predefined time period and (ii) a second predefined time period, the first and second predefined time periods associated with a respective one of an opening and a closing of the first shut-off valve. Upon determining that a difference between a maximum value of the plurality of sensor values captured during the first predefined time period and a maximum value of the plurality of sensor values captured during the second predefined time period exceeds the first threshold value for the first sensor parameter, a determination is made that the first shut-off valve is operating abnormally.

According to one aspect, a computer program product comprises a computer-readable storage medium having computer-readable code embodied therewith. The computer-readable program code is executable by a processor to perform an operation comprising identifying a plurality of maintenance messages (MMSGs). Each of the plurality of MMSGs is associated with at least one shut-off valve of a plurality of shut-off valves in a vehicle. The operation further includes identifying a first sensor parameter based on an analysis of a plurality of sensor parameters associated with the at least one shut-off valve associated with each MMSG. In addition, a first threshold value for the first sensor parameter is identified as being associated with abnormal operation of the respective at least one shut-off valve. A first sensor associated with a first shut-off valve of the plurality of shut-off valves then captures a plurality of values for the first sensor parameter during: (i) a first predefined time period and (ii) a second predefined time period, the first and second predefined time periods associated with a respective one of an opening and a closing of the first shut-off valve. Upon determining that a difference between a maximum value of the plurality of sensor values captured during the first predefined time period and a maximum value of the plurality of sensor values captured during the second predefined time period exceeds the first threshold value for the first sensor parameter, a determination is made that the first shut-off valve is operating abnormally.

According to one aspect, a system comprises a computer processor and a memory containing a program. The program is executable by the processor to perform an operation comprising identifying a plurality of maintenance messages (MMSGs). Each of the plurality of MMSGs is associated with at least one shut-off valve of a plurality of shut-off valves in a vehicle. The operation further includes identifying a first sensor parameter based on an analysis of a plurality of sensor parameters associated with the at least one shut-off valve associated with each MMSG. In addition, a first threshold value for the first sensor parameter is identified as being associated with abnormal operation of the respective at least one shut-off valve. A first sensor associated with a first shut-off valve of the plurality of shut-off valves then captures a plurality of values for the first sensor parameter during: (i) a first predefined time period and (ii) a second predefined time period, the first and second predefined time periods associated with a respective one of an opening and a closing of the first shut-off valve. Upon determining that a difference between a maximum value of the plurality of sensor values captured during the first predefined time period and a maximum value of the plurality of sensor values captured during the second predefined time period exceeds the first threshold value for the first sensor parameter, a determination is made that the first shut-off valve is operating abnormally.

DETAILED DESCRIPTION

Aspects disclosed herein provide techniques to detect faults in shut-off valves in aircraft (or other types of vehicles) using an n-second window of sensor data related to the shut-off valves. The n-second window of sensor data is captured as part of parametric flight data. Generally, aspects disclosed herein use an unsupervised learning algorithm to analyze data provided by sensors on previous flights to identify data values (and associated parameters) that indicate that a shut-off valve is operating abnormally. Once the parameters and data values are identified, aspects disclosed herein analyze n-second windows of real-time flight data after a valve opens and/or closes during flight. If the n-second windows of real-time flight data indicate that a given valve is operating abnormally, aspects disclosed herein may generate an indication of the abnormal operation. In some aspects, the indication of abnormal operation is transmitted from the aircraft to a receiving station on the ground, where maintenance crews and other personnel are alerted to the abnormal operation. For example, in one aspect, the indication includes a request to order a replacement valve for the valve that is operating abnormally. Doing so facilitates maintenance and repair of the aircraft prior to actual failure of the valve.

Because the learning algorithm disclosed herein is data-driven, the learning algorithm is model-free and need not be tailored to the specifics of the architecture and schematics of a given airplane. Furthermore, the learning algorithm is unsupervised in that a user need not intervene to manually create labels for training data. Therefore, the learning algorithm is flexible and portable across all types of aircraft, aircraft subsystems, and subsystem components. While an aircraft is used as a reference example herein, the disclosure is equally applicable to all types of vehicles that include shut-off valves.

Figure 1:
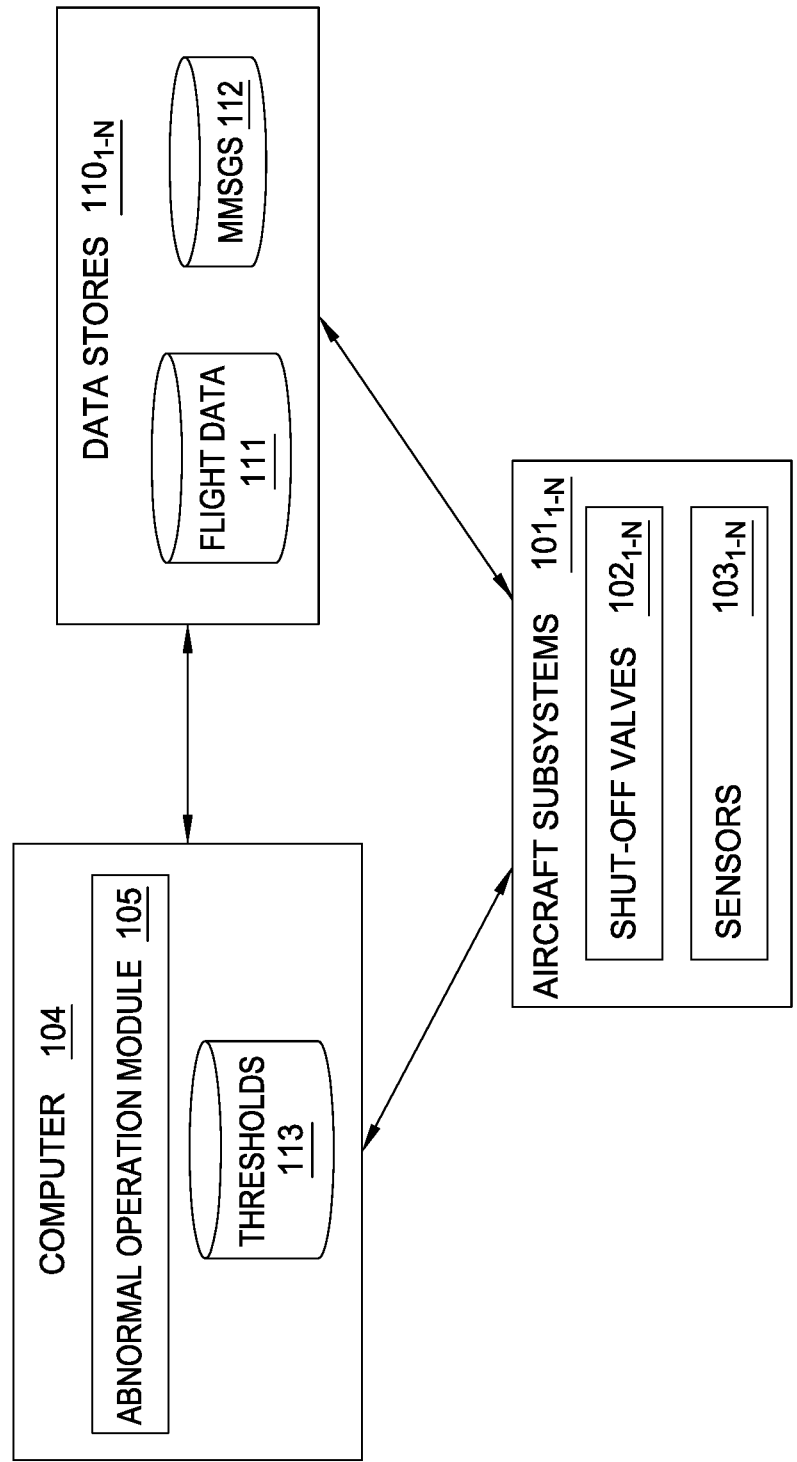
FIG. 1 is a block diagram illustrating components of a system which implements a data-driven, unsupervised algorithm for analyzing sensor data to detect abnormal valve operation, according to one aspect.

FIG. 1 is a block diagram illustrating components of a system 100 which implements a data-driven, unsupervised algorithm for analyzing sensor data to detect abnormal valve operation, according to one aspect. As shown, the system 100 includes a plurality of aircraft subsystems $101_{1-N}$, a computer 104, and a plurality of data stores $110_{1-N}$. The aircraft subsystems $101_{1-N}$ are representative of different subsystems in an aircraft, and include a plurality of shut-off valves $102_{1-N}$ and a plurality of sensors $103_{1-N}$. Examples of the aircraft subsystems $101_{1-N}$ include the economy cooling valve (ECV) subsystem, environmental control system (ECS), a fuel system, a pneumatic system, and the like. As used herein, a "shut-off valve" refers to a valve which operates in one of two states, namely an open state and a closed state. The shut-off valves $102_{1-N}$ regulate the flow of air, fuel, or any other type of liquid or gas in the subsystems $101_{1-N}$. The sensors $103_{1-N}$ are physical devices which detect conditions, events, and changes in the respective subsystem $101_{1-N}$, and generate corresponding data for storage in the data stores $110_{1-N}$. Examples of the sensors $103_{1-N}$ include temperature sensors, pressure sensors, airspeed sensors, humidity sensors, altitude sensors, and the like. For example, if a temperature sensor $103_1$ detects a 30° air temperature when a shut-off valve $102_1$ is closed, the temperature sensor $103_1$ converts the temperature reading to a digital format, and transmits an indication of the detected temperature to the data stores $110_{1-N}$ for storage in the flight data 111.

The data stores $110_{1-N}$ are representative of any type of system which stores parametric flight data, such as the Flight Data Recorder (FDR), Quick Access Record (QAR), Continuous Parameter Logging System (CPL), and the Enhanced Airborne Flight Recorder (EAFR). As shown, each data store $110_{1-N}$ includes stores of flight data 111 and a data store of maintenance messages (MMSGs) 112. The flight data 111 stores parametric flight data describing the operation of the associated aircraft. Generally, parametric flight data is a collection of time-series data collected during operation of an aircraft. The parameters of the parametric flight data include, without limitation, parameters describing the altitude of the aircraft, speed of the aircraft, temperature data, pressure data, and the like. More generally, the flight data 111 stores data values for a plurality of parameters generated by the sensors $103_{1-N}$, such as a state of each shut-off valve $102_{1-N}$ (e.g., open or closed), as well as other sampled values, such as temperature, pressure, humidity readings, and the like. In at least one aspect, the shut-off valves $102_{1-N}$ transmit their respective state (e.g., open or closed) to the flight data 111.

The maintenance messages stored in the MMSGs 112 are generated responsive to abnormal operations of the aircraft or any component thereof. For example, a sensor $103_N$ records an air temperature of 100° C. proximate to one of the shut-off valves $102_N$, exceeding an example temperature threshold of 80° C. In response, the sensor $103_N$ and/or a designated component of the aircraft generates an MMSG based on the recorded temperature, which is then stored in the MMSGs 112. Each MMSG 112 is associated with metadata parameters such as a respective timestamp, one or more recorded parameters (e.g., temperature) that exceed an associated rule, an affected component of the aircraft (e.g., one or more shut-off valves $102_{1-N}$), and the like.

As shown, the computer 104 includes the abnormal operation module 105 and the thresholds 113. The abnormal operation module 105 is an application configured to detect abnormal operation of the shut-off valves $102_{1-N}$. The abnormal operation module 105 implements an unsupervised learning algorithm which analyzes historical parametric flight data in the data stores $110_{1-N}$ (for one or more aircraft) to identify the parameters provided by the sensors $103_{1-N}$ that are relevant to detecting abnormal behavior in the shut-off valves $102_{1-N}$. Furthermore, the abnormal operation module 105 determines, for each identified parameter, a corresponding threshold value which indicates that a given shut-off valve $102_{1-N}$ is operating abnormally (or will begin operating abnormally). The abnormal operation module 105 may then store the identified parameters and associated threshold values in the thresholds 113. Doing so allows the abnormal operation module 105 to analyze the data stores $110_{1-N}$ in real-time during subsequent flights (of the same or other similar aircraft), and determine whether the sensors $103_{1-N}$ are providing data values for the identified parameters that exceed the corresponding threshold. If the abnormal operation module 105 determines that the data values for the identified threshold exceed the corresponding thresholds, the abnormal operation module 105 determines that the associated shut-off valve(s) $102_{1-N}$ is operating abnormally. The abnormal operation module 105 then generates an indication (e.g., an alert) specifying which of the shut-off valves $102_{1-N}$ are operating abnormally. In one aspect, the indication includes the associated parametric data from the data stores $110_{1-N}$ which reflect that the shut-off valves $102_{1-N}$ are operating abnormally. Doing so facilitates safety by alerting relevant personnel to the abnormally operating shut-off valves $102_{1-N}$, who may then take appropriate measures in response. For example, a maintenance crew may order the parts necessary to repair and/or replace the abnormally operating shut-off valves $102_{1-N}$ before the plane lands, resulting in quicker turn-around, avoidance of delays, and cost savings.

In one aspect, a user defines an initial set of parameters provided as input to the abnormal operation module 105. The initial set of parameters includes parameters from the QAR, FDL, CPL, and/or EAFR. For example, such parameters may include temperature parameters, pressure parameters, and airflow parameters measured by the sensors $103_{1-}$ N. In one aspect, the user also defines one or more flight phases provided as input to the abnormal operation module 105. Example flight phases include taxi, takeoff, initial climb, landing, and the like. In such aspects, the abnormal operation module 105 analyzes the parametric flight data 111 that is associated with the specified flight phases, rather than all of the parametric flight data for the initial set of parameters.

The abnormal operation module 105 performs an analysis of the flight data 111 to identify a subset of the initial set of parameters that are relevant to determining that a shut-off valve $102_{1-N}$ is operating abnormally. Furthermore, the abnormal operation module 105 computes a threshold value for each parameter in the subset. To do so, the abnormal operation module 105 determines, based on the flight data 111, when a given shut-off valve $102_N$ previously opened and closed. Generally, the flight data 111 includes a corresponding record reflecting each time one of the shut-off valves $102_{1-N}$ opens or closes. The abnormal operation module 105 then obtains, for each open and close event of the shut-off valve $102_N$, an n-second window of values for each parameter in in the initial set of parameters. The n-second window may be of any length, such as 60 seconds, 120 seconds, and the like, and may be specified by the user, or be a predefined value coded in the abnormal operation module 105. The abnormal operation module 105 then identifies, for each parameter in the initial set of parameters, a maximum value during each n-second interval. The abnormal operation module 105 then computes, for each variable, a difference between the maximum value of an n-second interval after an open of the shut-off valve $102_N$ and the maximum value of an n-second window after the next close of the same shut-off valve $102_N$.

Figure 2A:
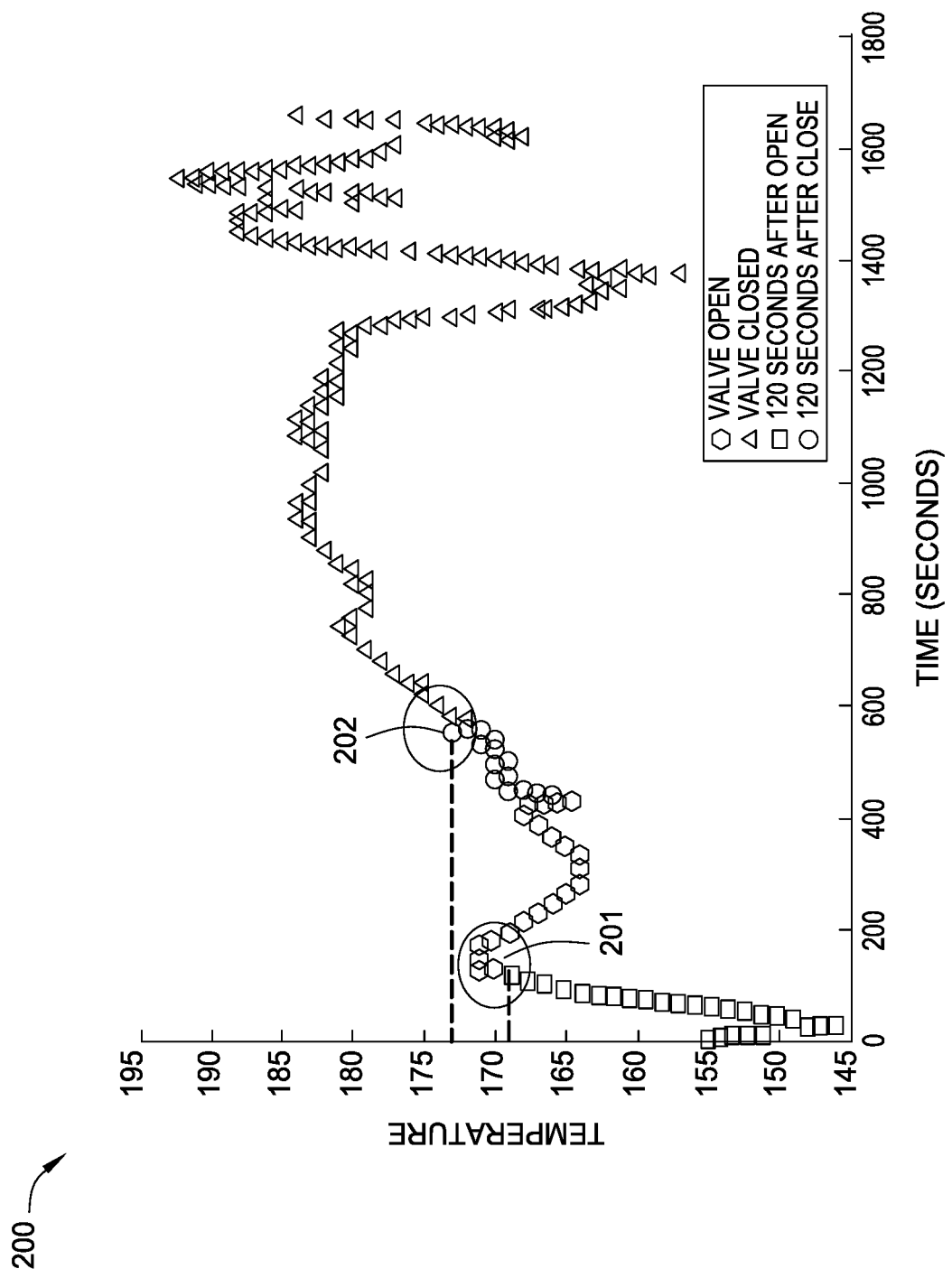
FIGS. 2A-2B illustrate example techniques for detecting abnormal operation of valves based on a data-driven, unsupervised algorithm for analyzing sensor data, according to various aspects.

FIG. 2A depicts a graph 200 generated from example temperature values stored in the flight data 111. The y-axis of the graph 200 corresponds to temperature values for a temperature parameter (e.g., in the initial set of parameters) recorded by a sensor $103_N$ associated with a shut-off valve $102_N$. The x-axis of the graph is associated with time. As shown, the temperature value is approximately 155 degrees Celsius when the shut-off valve $102_N$ opens at 0 seconds. The maximum value of the n-second interval (120 seconds in this example) occurs at point 201, which is approximately 169 degrees Celsius. After the next close of the shut-off valve $102_N$, the maximum observed temperature of approximately 174 degrees Celsius occurs at point 202. Therefore, for the opening and closing events of the shut-off valve $102_N$ depicted in FIG. 2A, the difference between the maximum temperature values in each 120-second window computed by the abnormal operation module 105 is approximately 5 degrees Celsius (e.g., 174−169=5). For the sake of clarity, the difference between maximum parameter values is referred to herein as a "max_diff" value.

The abnormal operation module 105 computes max_diff values for each parameter in the initial set of parameters and for each open and close of a given shut-off valve $102_N$. The abnormal operation module 105 then performs a further analysis to identify the subset of the initial set of parameters that are associated with abnormal operation for a given shut-off valve $102_N$ (and similar or identical shut-off valves $102_{1-N}$). Generally, the abnormal operation module 105 computes, for each parameter in the initial set of parameters, a corresponding percentile threshold value for each computed max_diff value. In one aspect, the percentile threshold value is three standard deviations of the computed max_diff values for the associated parameter. Continuing with the temperature example depicted in FIG. 2A, an example percentile threshold max_diff value of 21 degrees is computed by the abnormal operation module 105, where 21 degrees represents the $95^{th}$ percentile (or three standard deviations) of all max_diff values computed for the temperature parameter.

The abnormal operation module 105 then identifies each computed max_diff value which exceeds the percentile threshold. For example, the abnormal operation module 105 identifies temperature max_diff values of 22, 23, 24, and 25 degrees at example times t=1, t=2, t=3, and t=4, respectively for the example temperature parameter depicted in FIG. 2A. To identify a threshold max_diff threshold value which indicates a shut-off valve $102_{1-N}$ is operating abnormally, the abnormal operation module 105 then steps through each max_diff value in increments of 0.1, until the maximum max_diff value is reached (e.g., $100^{th}$ percentile of max_diff values).

For each max_diff value, the abnormal operation module 105 identifies MMSGs associated with a shut-off valve $102_{1-N}$ in the MMSGs 112. For each identified MMSG in the MMSGs 112, the abnormal operation module 105 computes a ratio of false positives to true positives for the current MMSG. To do so, the abnormal operation module 105 determines whether the current max_diff value occurred within a predefined time period (e.g., within 7 days, 14 days, 24 days, etc.) of a time of the current max_diff value. Therefore, continuing with the temperature example from FIG. 2A, if the current max_diff value is 23, the abnormal operation module 105 determines whether the current MMSG occurred within 24 days of time t=2. If the current max_diff value occurred within the predefined time period, the abnormal operation module 105 considers the current max_diff value as a true positive. Otherwise, the abnormal operation module 105 considers the current max_diff value as a false positive. Generally, the abnormal operation module 105 computes a ratio of false positives to true positives for each max_diff value (e.g., 22.0, 22.1, 22.2, . . . , 24.8, 24.9, 25.0). The abnormal operation module 105 then defines the threshold for the parameter. In one aspect, the abnormal operation module 105 defines the threshold as the max_diff value that has the lowest computed ratio of false positives to true positives. For example, if the computed ratio for 22.2 is the lowest of the computed ratios, in such aspects, the abnormal operation module 105 would define 22.2 as the threshold for the temperature parameter. In another aspect, the abnormal operation module 105 defines the threshold as the max_diff value that occurs within the predefined time period of each identified MMSG associated with a shut-off valve $102_{1-N}$. For example, if the max_diff value of 22.5 occurred within 24 days of each MMSG, in such aspects, the abnormal operation module 105 defines 22.5 as the threshold value for the temperature parameter. The abnormal operation module 105 then saves the threshold value and an indication of the parameter in the thresholds 113. Doing so includes the parameter as a member of the subset of the initial set of parameters.

Figure 2B:
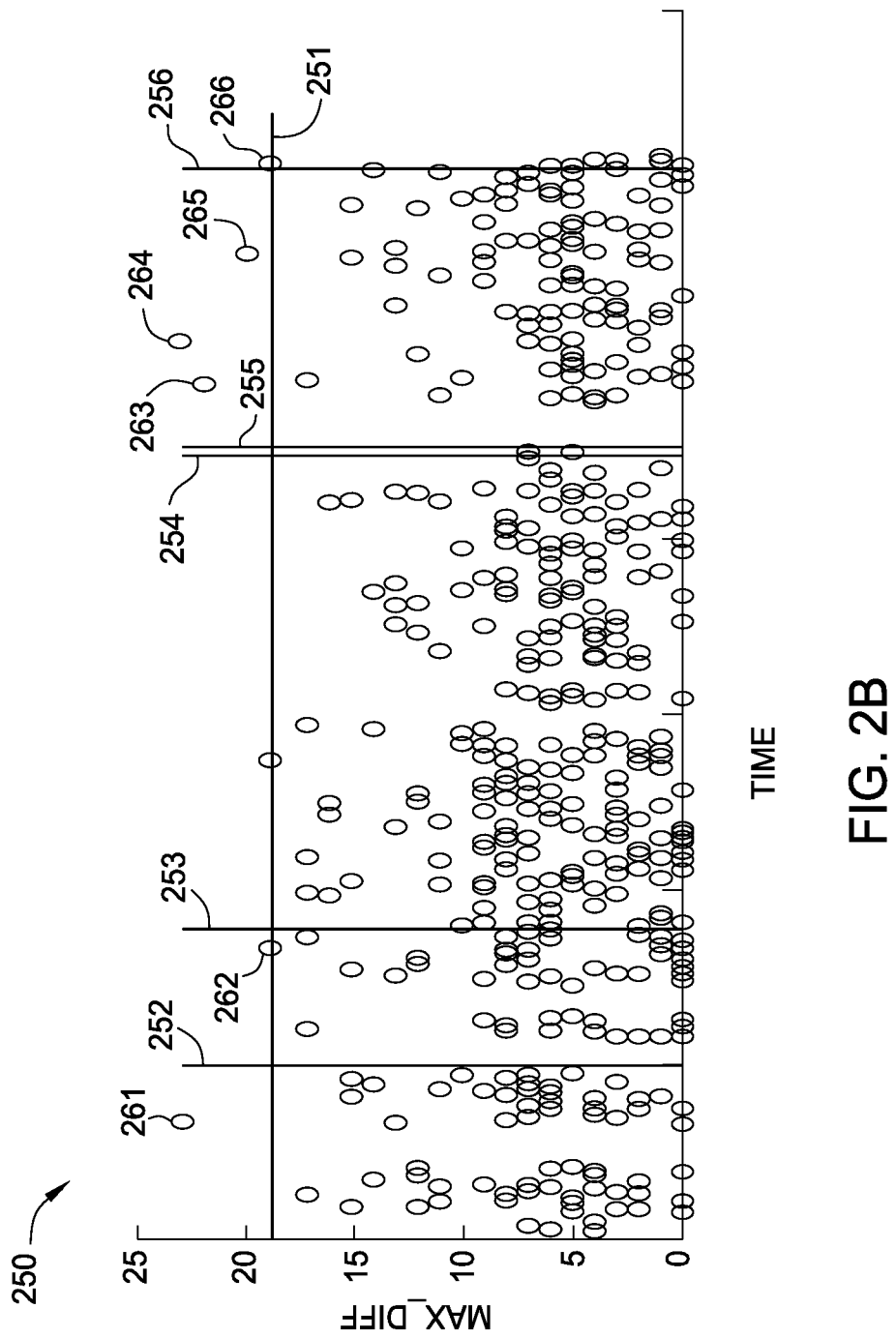

FIG. 2B depicts a graph 250 which includes the computed max_diff temperature values as the y-axis, and time as the x-axis, according to one aspect. As shown, the graph 250 includes an example threshold max_diff value 251 computed by the abnormal operation module 105 as described above. As shown, the threshold max_diff value 251 is approximately 19 degrees. Furthermore, the graph 250 includes vertical lines 252-256, each of which corresponds to an MMSG in the MMSGs 112. Further still, example max_diff values 261-266 are labeled in the graph 250, to note the proximity to each MMSG line 252-256. As previously indicated, in one aspect, the abnormal operation module 105 computes the threshold value 251 as the value which is associated with the lowest ratio of false positives to true positives (based on the proximity in time to a given MMSG). For example, if the abnormal operation module 105 detects one false positive and ten true positives, the computed ratio is 0.1. In another aspect, the abnormal operation module 105 defines the threshold value 251 based on the max_diff value which captures all MMSGs (e.g., each instance of a max_diff value above the threshold is within the predefined time period (e.g., 24 days) of a given MMSG 252-256.

Some parameters are not good indicators of fault and/or abnormal operation of a shut-off valve $102_{1-N}$. The abnormal operation module 105 discards these parameters, as these parameters often do not have max_diff values that are associated with any (or very few) true positives. Therefore, the ratio of false positives to true positives is undefined (due to division by zero), or very large. As such, the abnormal operation module 105 discards any such parameters. For example, in one aspect, the abnormal operation module 105 discards parameters whose ratio of false positives to true positives exceeds a relevance threshold, or those parameters whose ratio is undefined. Therefore, the abnormal operation module 105 defines the subset of the initial set of parameters as those parameters whose max_diff values are responsible for abnormal operation of shut-off valves $102_{1-N}$ as reflected by the association of these values and MMSGs in the MMSGs 112.

Once the abnormal operation module 105 has identified the subset of parameters and the corresponding threshold values, the abnormal operation module 105 uses the subset and corresponding threshold values to determine whether flight data 111 captured in real-time during a flight reflects that a shut-off valve $102_{1-N}$ is operating abnormally. Generally, during a flight (or one of the predefined phases of the flight), the sensors $103_{1-N}$ provide parametric flight data to the flight data 111. Each time the shut-off valves $102_{1-N}$ open or close, the abnormal operation module 105 identifies n-second windows of parametric flight data for the parameters in the subset of parameters defined in the thresholds 113. The abnormal operation module 105 then computes a max_diff value for each parameter in the subset of parameters for each n-second window after an open and close (or close and open). In one example, the abnormal operation module 105 computes max_diff temperature values, pressure values, and the like based on the n-second windows of data captured by the sensors $103_{1-N}$. If the computed max_diff value exceeds the corresponding threshold, the abnormal operation module 105 determines that the corresponding shut-off valve $102_N$ is operating abnormally. Continuing with the previous temperature example, if the abnormal operation module 105 computes a max_diff of 28 degrees for the temperature parameter, the abnormal operation module 105 determines that the max_diff value of 28 exceeds the example threshold of 19 degrees depicted in FIG. 2B. As such, the abnormal operation module 105 determines that the associated shut-off valve $102_N$ is operating abnormally (or is faulty). In one aspect, the abnormal operation module 105 then generates an indication specifying that the shut-off valve $102_N$ is faulty. In one aspect, the abnormal operation module 105 transmit the indication from the aircraft to a remote system, which allows maintenance crews to obtain replacement parts, schedule repairs, and the like.

In some aspects, however, the computer 104 executing the abnormal operation module 105 is an external system which receives the flight data 111 and MMSGs 112 from a plurality of different aircraft (e.g., via a network connection). Therefore, in such embodiments, the abnormal operation module 105 leverages flight data 111 and MMSGs 112 from these different aircraft when identifying relevant parameters in the subset of parameters, and determining the associated thresholds which reflect a given shut-off valve is operating abnormally. In such aspects, the abnormal operation module 105 executing on the remote computer 104 can receive real-time flight data from a plurality of different aircraft, and determine whether a given aircraft has a shut-off valve $102_N$ that is operating abnormally.

Figure 3:
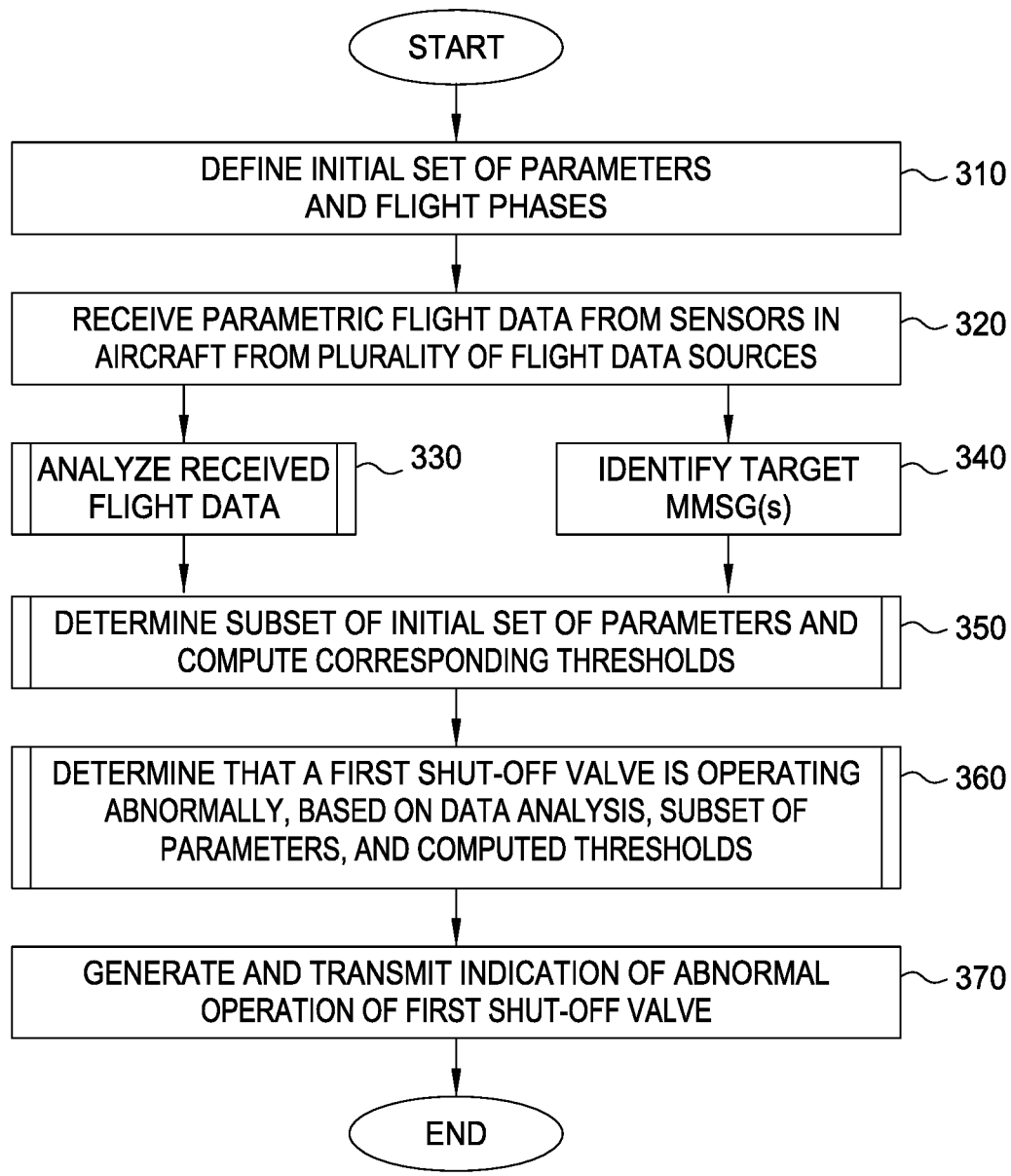
FIG. 3 is a flow chart illustrating a method for detecting abnormal operation of valves based on a data-driven, unsupervised algorithm for analyzing sensor data, according to one aspect.

FIG. 3 is a flow chart illustrating a method 300 for detecting abnormal operation of shut-off valves based on a data-driven, unsupervised algorithm for analyzing sensor data, according to one aspect. As shown, the method 300 begins at block 310, where a user defines the initial set of parameters and any applicable flight phases. Doing so allows the abnormal operation module 105 to operate on an initial subset of the thousands or millions of parameters stored in the flight data 111. At block 320, the abnormal operation module 105 receives parametric flight data 111. As previously indicated, the parametric flight data 111 is generated by the shut-off valves $102_{1-N}$ and sensors $103_{1-N}$. Generally, the received flight data 111 reflects flight data 111 captured on multiple flight legs. In at least one aspect, the received flight data 111 further reflects flight data 111 captured by multiple aircraft.

At block 330, described in greater detail with reference to FIG. 4, the abnormal operation module 105 analyzes the flight data. Generally, at block 330, the abnormal operation module 105 computes max_diff values for the parameters in the flight data 111. At block 340, which occurs in parallel with block 330 in one aspect, the abnormal operation module 105 identifies the target MMSGs in the MMSGs 112. Generally, the target MMSGs are those MMSGs that are associated with abnormal operation of shut-off valves $102_{1-N}$. At block 350, described in greater detail with reference to FIG. 5, the abnormal operation module 105 determines the subset of the initial set of parameters that are relevant to detecting abnormal behavior in the shut-off valves $102_{1-N}$, and computes a threshold value for each parameter in the subset of parameters.

At block 360, described in greater detail with reference to FIG. 6, the abnormal operation module 105 determines that a first shut-off valve $102_N$ is operating abnormally based on the data analysis, subset of parameters, and thresholds for the subset of parameters. Generally, at block 360, the abnormal operation module 105 analyzes real-time flight data to determine that the shut-off valve $102_N$ is operating abnormally. For example, if the threshold max_diff value for a temperature parameter of a turbine inlet is 40 degrees, the abnormal operation module 105 may determine that the corresponding shut-off valve $102_N$ is operating abnormally when the max_diff of the turbine inlet for a given open/close cycle is 50 degrees. At block 370, the abnormal operation module 105 generates and transmits an indication specifying that the first shut-off valve $102_N$ is operating abnormally.

Figure 4:
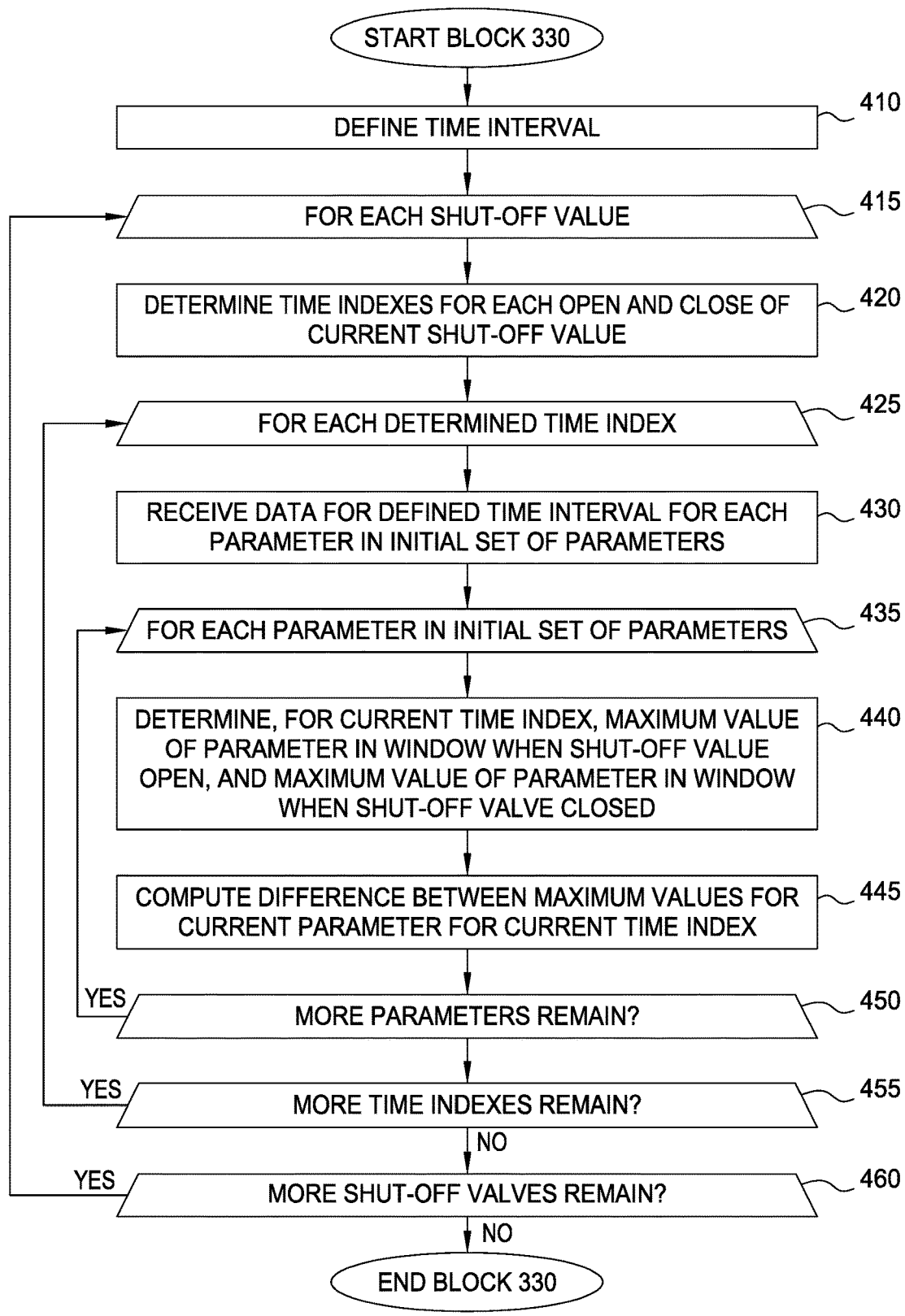
FIG. 4 is a flow chart illustrating a method for analyzing flight data from sensors in an aircraft, according to one aspect.

FIG. 4 is a flow chart illustrating a method 400 corresponding to block 330 for analyzing flight data from sensors in an aircraft, according to one aspect. As shown, the method 400 begins at block 410, where a user optionally defines a time interval (e.g., 120 seconds) for the n-second window of parametric flight data analyzed after a shut-off valve $102_N$ opens and/or closes. In at least one aspect, however, the n-second time interval is a predefined value in the abnormal operation module 105. At block 415, the abnormal operation module 105 executes a loop including blocks 420-460 for each shut-off valve $102_{1-N}$ for which data in the flight data 111 exists. At block 420, the abnormal operation module 105 determines the time indexes in the flight data 111 which reflect each open and close of the current shut-off valve $102_N$. At block 425, the abnormal operation module 105 executes a loop including blocks 430-455 for each determined time index.

At block 430, the abnormal operation module 105 receives data for the defined time interval (e.g., 120 seconds) from the flight data 111 for each parameter in the initial set of parameters. For example, the abnormal operation module 105 may receive temperature parameters and associated values, pressure parameters and associated values, altitude parameters and associated values, and the like. At block 440, the abnormal operation module 105 executes a loop including blocks 440-450 for each parameter in the initial set of parameters. At block 440, the abnormal operation module 105 determines, for the current time index (e.g., an open/close or close/open cycle), the maximum value for the current parameter in the n-second window of data after the open and close. For example, the abnormal operation module 105 may identify a maximum temperature value of 210 degrees in the n-second window after the current shut-off valve $102_N$ opens, and a maximum temperature value of 140 degrees in the n-second window after the current shut-off valve $102_N$ closes. At block 445, the abnormal operation module 105 computes the difference between the maximum values determined at block 450. Stated differently, the abnormal operation module 105 computes the max_diff value for the current parameter and time index. Continuing with the previous example, the abnormal operation module 105 would compute a max_diff value of 210−140=70 degrees for the current temperature parameter and time index. In one aspect, the abnormal operation module 105 stores the computed max_diff value for later use.

At block 450, the abnormal operation module 105 determines whether more parameters remain in the initial set of parameters. If more parameters remain, the abnormal operation module 105 returns to block 435. Otherwise, the abnormal operation module 105 proceeds to block 455. At block 455, the abnormal operation module 105 determines whether more time indexes remain. If more time indexes remain, the abnormal operation module 105 returns to block 425, otherwise, the abnormal operation module 105 proceeds to block 460. At block 460, the abnormal operation module 105 determines whether more shut-off valves $102_{1-N}$ remain. If so, the abnormal operation module 105 returns to block 415. Otherwise, the method 400 ends.

Figure 5:
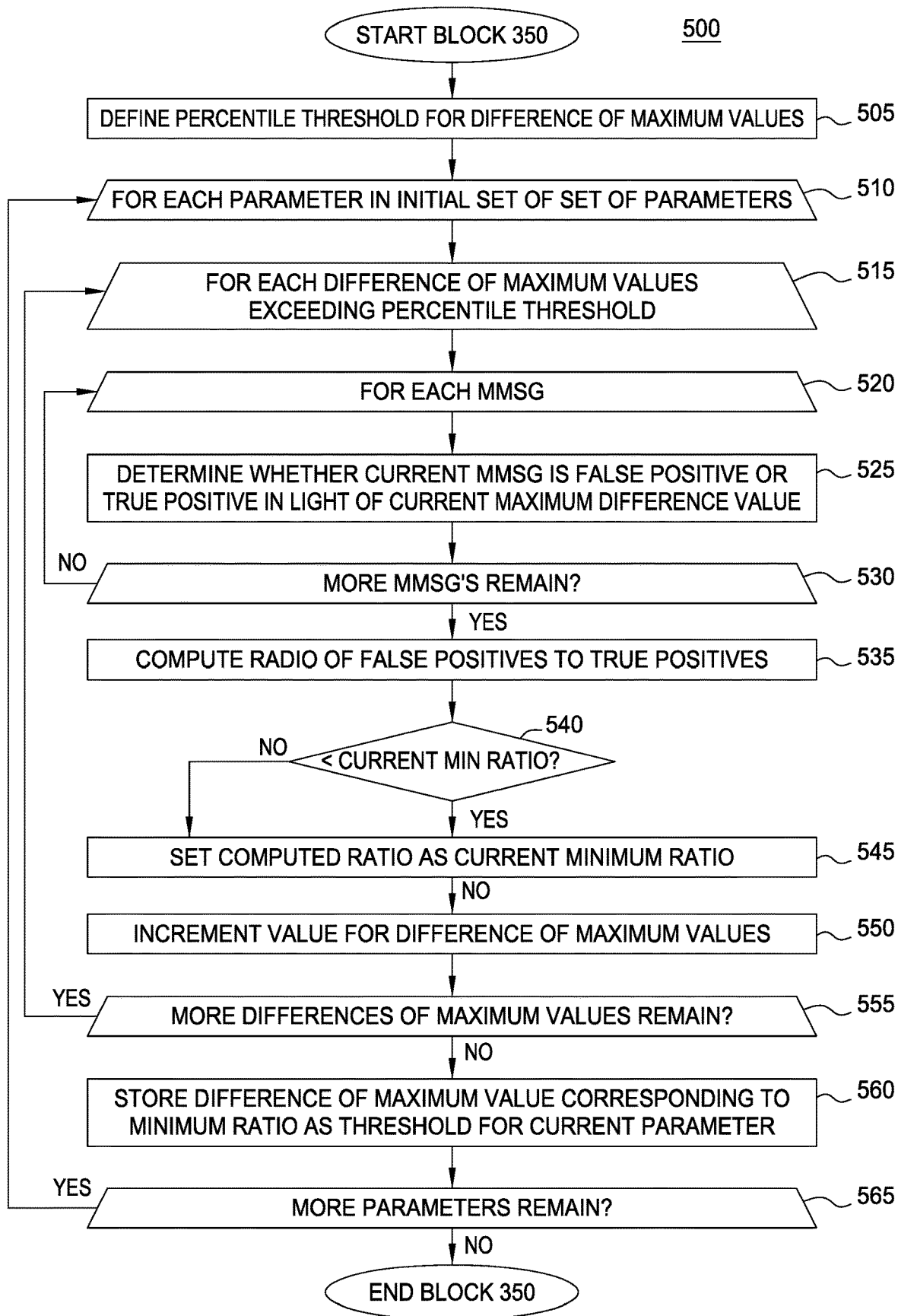
FIG. 5 is a flow chart illustrating a method for determining relevant variables and computing thresholds for relevant variables, according to one aspect.

FIG. 5 is a flow chart illustrating a method 500 corresponding to block 350 for determining relevant variables and computing thresholds for relevant variables, according to one aspect. As shown, the method 500 begins at block 505, where a user optionally defines the percentage threshold for max_diff values (e.g., two standard deviations). In at least one aspect, however, the percentage threshold is predefined in the abnormal operation module 105. At block 510, the abnormal operation module 105 executes a loop including blocks 515-565 for each parameter in the initial set of parameters. At block 515, the abnormal operation module 105 executes a loop including blocks 520-555 for each computed max_diff value for the current parameter that exceeds the threshold defined at block 510. At block 520, the abnormal operation module 105 executes a loop including blocks 525-530 for each MMSG in the MMSGs 112 identified at block 340.

At block 525, the abnormal operation module 105 determines whether the current MMSG 112 is a false positive or a true positive relative to the current max_diff value. Generally, to do so, the abnormal operation module 105 determines whether the current MMSG 112 occurred within a predefined time period (e.g., 24 days) of the current max_diff value. For example, if the current MMSG 112 occurred on Jan. 25, 2017, and the current max_diff value was observed on Jan. 24, 2017, the abnormal operation module 105 determines that the MMSG 112 is a true positive. At block 530, the abnormal operation module 105 determines whether more MMSGs remain. If more MMSGs remain, the abnormal operation module 105 returns to block 520. Otherwise, the abnormal operation module 105 proceeds to block 535.

At block 535, the abnormal operation module 105 computes the ratio of false positives to true positives for the current parameter. At block 540, the abnormal operation module 105 determines whether the ratio computed at block 535 is less than the current minimum ratio. If the ratio computed at block 535 is not less than the current minimum ratio (or is undefined), the abnormal operation module 105 proceeds to block 550. However, if the ratio computed at block 535 is less than the current minimum ratio (and is not undefined), the abnormal operation module 105 proceeds to block 545, where the abnormal operation module 105 sets the ratio computed at block 535 as the current minimum ratio, and associates the current minimum ratio with the current max_diff value.

At block 550, the abnormal operation module 105 increments the current value for the max_diff value of the current parameter. For example, in one aspect, the abnormal operation module 105 increments the max_diff value of the current parameter by 0.1, as described above, until the maximum max_diff value is analyzed. At block 555, the abnormal operation module 105 determines whether more max_diff values remain. If more max_diff values remain, the method returns to block 515, otherwise, the abnormal operation module 105 proceeds to block 560. At block 560, the abnormal operation module 105 stores the max_diff value associated with the minimum ratio of false positives to true positives as the threshold for the current parameter in the thresholds 113. Doing so defines the current parameter as a member of the subset of the initial set of parameters, e.g., a parameter that is relevant to detecting faults in the shut-off valves $102_{1-N}$. However, if there is no minimum ratio, the abnormal operation module 105 discards the current parameter as not being relevant. At block 565, the abnormal operation module 105 determines whether more parameters remain in the initial set of parameters. If more parameters remain, the abnormal operation module 105 returns to block 510, otherwise, the method 500 ends.

Figure 6:
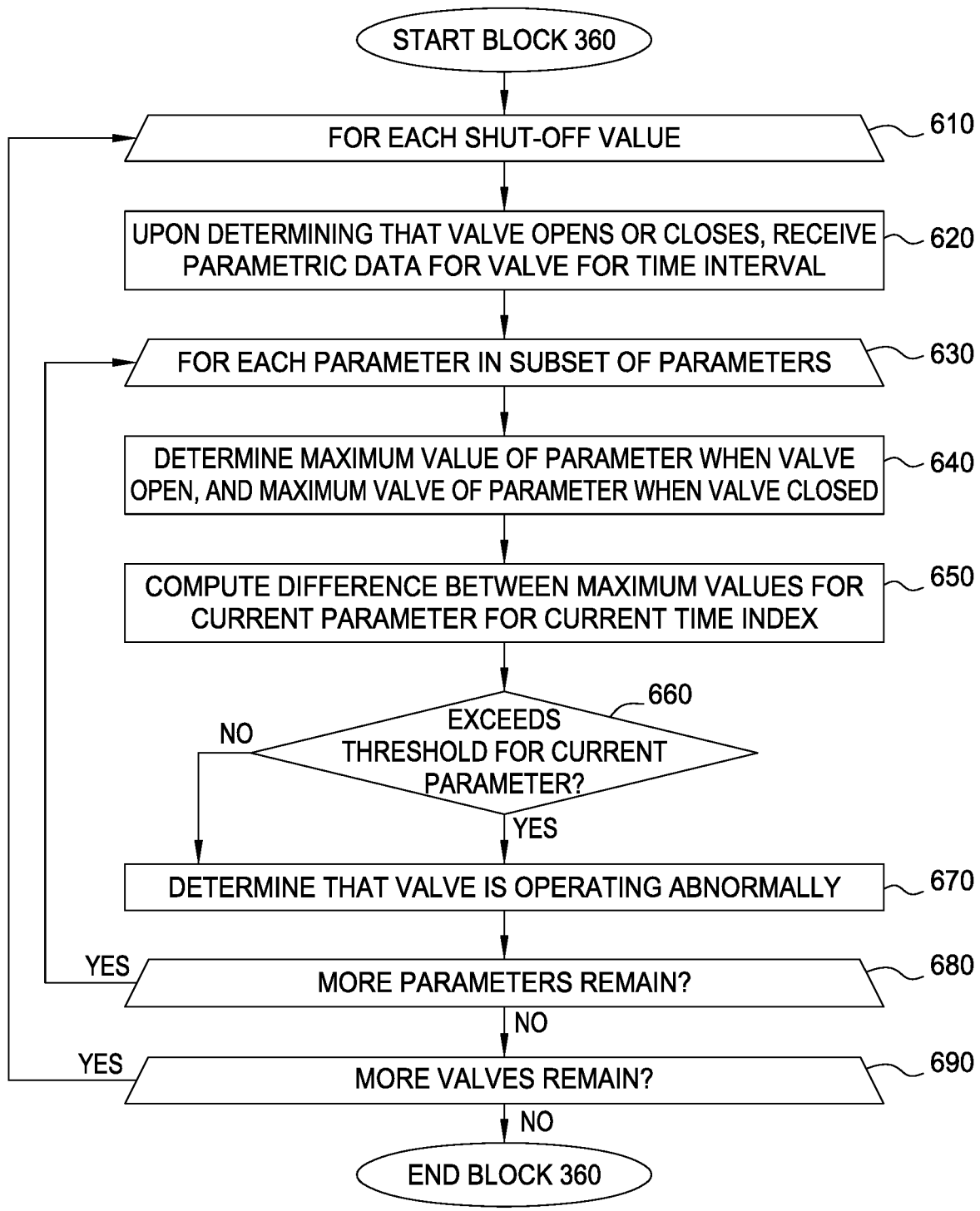
FIG. 6 is a flow chart illustrating a method to determine that a first valve of an aircraft is operating abnormally based on data analysis, relevant variables, and computed thresholds, according to one aspect.

FIG. 6 is a flow chart illustrating a method 600 corresponding to block 360 to determine that a first valve of an aircraft is operating abnormally based on data analysis, relevant variables, and computed thresholds, according to one aspect. Generally, the abnormal operation module 105 executes the method 600 to determine whether real-time flight data 111 indicates whether a given shut-off valve $102_N$ is operating abnormally during a flight based on the training data stored in the thresholds 113. As shown, the method 600 begins at block 610, where the abnormal operation module 105 executes a loop including blocks 620-690 for each shut-off valve $102_N$ in the aircraft.

At block 620, the abnormal operation module 105, upon determining that the current shut-off valve $102_N$ has opened or closed, receives parametric data from the flight data 111. For example, the abnormal operation module 105 may receive temperature data, pressure data, altitude data, and the like, where the data is generated by the sensors $103_{1-N}$. In addition, the data received from the flight data 111 is limited to an n-second window following the open and close of the shut-off valve $102_N$. At block 630, the abnormal operation module 105 executes a loop including blocks 640-680 for each parameter in the subset of parameters defined in the thresholds 113. In at least one aspect, the parameters in the subset of parameters are associated with the current shut-off valve $102_N$ (or a substantially similar shut-off valve).

At block 640, the abnormal operation module 105 determines the maximum values of the current parameter in the n-second windows of flight data received at block 620 after the shut-off valve $102_N$ opens and closes. At block 650, the abnormal operation module 105 computes a difference between the maximum values identified at block 640. Stated differently, the abnormal operation module 105 computes the max_diff value for the current parameter. At block 660, the abnormal operation module 105 determines whether the max_diff value computed at block 650 exceeds the threshold for the current parameter (as defined in the thresholds 113). If the max_diff value exceeds the threshold, the abnormal operation module 105 proceeds to block 670, otherwise, the abnormal operation module 105 proceeds to block 680. At block 670, the abnormal operation module 105 determines that the current shut-off valve $102_N$ is operating abnormally based on the computed max_diff exceeding the corresponding threshold. At block 680, the abnormal operation module 105 determines whether more parameters remain. If more parameters remain, the abnormal operation module 105 returns to block 630, otherwise, the abnormal operation module 105 proceeds to block 690. At block 690, the abnormal operation module 105 determines whether more shut-off valves $102_{1-N}$ remain in the aircraft. If so, the abnormal operation module 105 returns to block 610, otherwise the method 600 ends.

Figure 7:
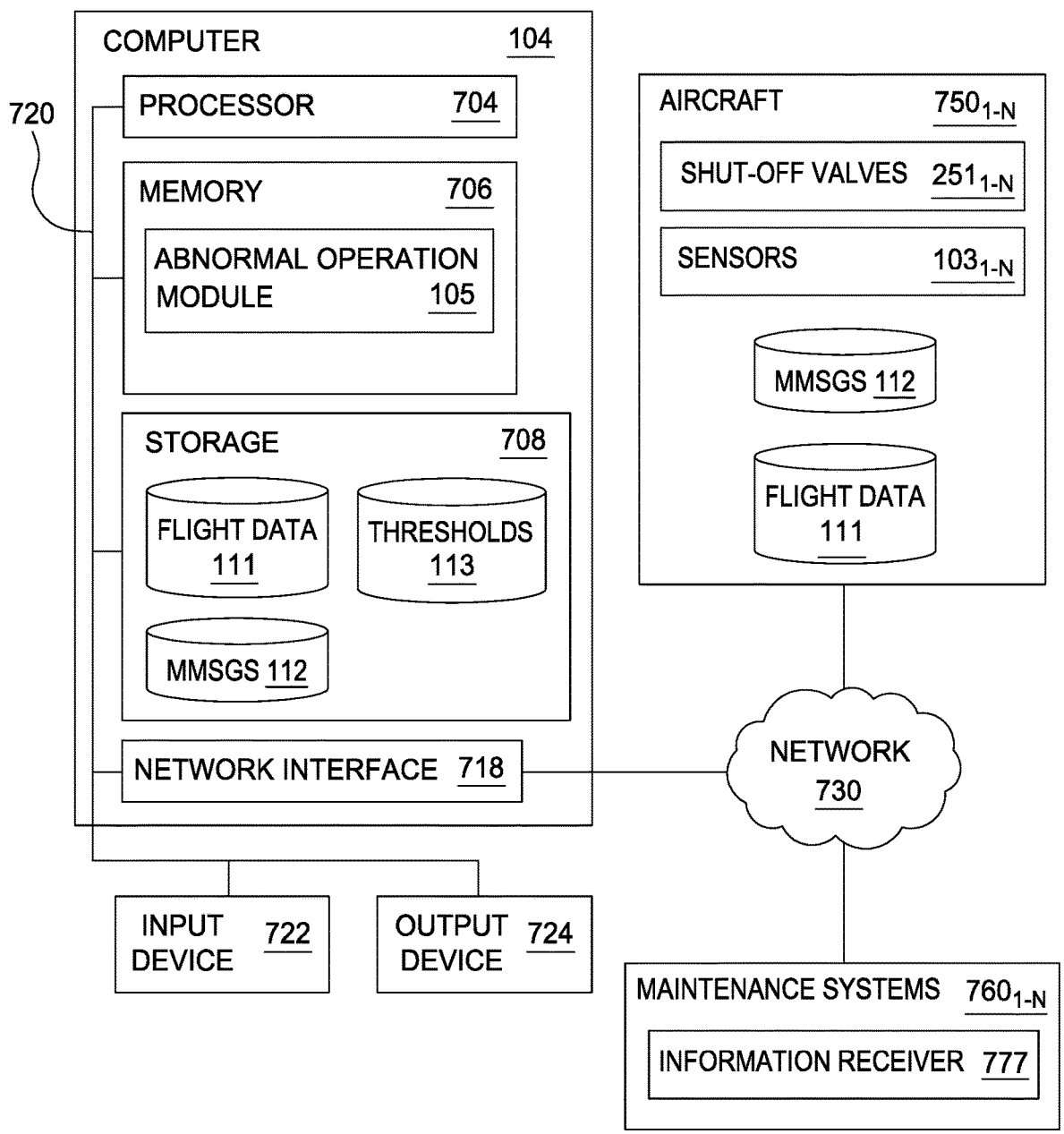
FIG. 7 illustrates a system configured to detect abnormal valve operation based on a data-driven, unsupervised algorithm for analyzing sensor data, according to one aspect.

FIG. 7 illustrates a system 700 configured to detect abnormal valve operation based on a data-driven, unsupervised algorithm for analyzing sensor data, according to one aspect. The networked system 700 includes the computer 104. The computer 104 may also be connected to other computers via a network 730. In general, the network 730 may be a telecommunications network and/or a wide area network (WAN). In a particular embodiment, the network 730 is the Internet.

The computer 104 generally includes a processor 704 which obtains instructions and data via a bus 720 from a memory 706 and/or a storage 708. The computer 104 may also include one or more network interface devices 718, input devices 722, and output devices 724 connected to the bus 720. The computer 104 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 704 is a programmable logic device that performs instruction, logic, and mathematical processing, and may be representative of one or more CPUs. The network interface device 718 may be any type of network communications device allowing the computer 104 to communicate with other computers via the network 730.

The storage 708 is representative of hard-disk drives, solid state drives, flash memory devices, optical media and the like. Generally, the storage 708 stores application programs and data for use by the computer 104. In addition, the memory 706 and the storage 708 may be considered to include memory physically located elsewhere; for example, on another computer coupled to the computer 104 via the bus 720.

The input device 722 may be any device for providing input to the computer 104. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the computer 104. The output device 724 may include output devices such as monitors, touch screen displays, and so on.

As shown, the memory 706 contains the abnormal operation module 105, while the storage 708 contains the flight data 111, MMSGs 112, and thresholds 113. Generally, the system 700 is configured to implement all functionality described above with reference to FIGS. 1-6.

As shown, the system 700 further includes a plurality of aircraft $750_{1-N}$ and maintenance systems $760_{1-N}$ communicably coupled to the computer 104 via the network 730. As shown, the aircraft $750_{1-N}$ include a plurality of shut-off valves $102_{1-N}$, a plurality of sensors $103_{1-N}$, flight data 111, and MMSGs 112. In at least one aspect, a given aircraft $750_{1-N}$ communicates over the network using the Aircraft Communication and Addressing Reporting System (ACARS). As shown, the maintenance systems $760_{1-N}$ include an information receiver 777, which is configured to receive indications of abnormally operating shut-off valves $102_{1-N}$ in the aircraft $750_{1-N}$ from the abnormal operation module 105.

For example, in one aspect, the information receiver 777 receives an alert message from the abnormal operation module 105 indicating one or more shut-off valves $102_{1-N}$ are operating abnormally in one or more aircraft $750_{1-N}$. In one aspect, the information receiver 777 schedules maintenance for the corresponding aircraft $750_N$ in response to the alert message. In addition, the information receiver 777 automatically orders replacement parts to repair the faulty shut-off valves $102_{1-N}$. Furthermore, the information receiver 777 outputs the alert message to a mechanic for review, allowing the mechanic to plan for the maintenance (including reviewing whether the appropriate parts were automatically ordered by the information receiver 777). In some aspects, when the aircraft $750_N$ lands, the mechanic is able to fix the faulty shut-off valves $102_{1-N}$.

Advantageously, aspects disclosed herein provide techniques to determine that shut-off valves are faulty or operating abnormally based on an unsupervised learning algorithm. The unsupervised learning algorithm is model free, and includes a learning phase which identifies relevant parameters and corresponding threshold values. The data generated during the learning phase is then used to analyze real-time flight data. If the real-time flight data includes values which exceed a given threshold, aspects disclosed herein determine that the associated shut-off valve is operating abnormally or is faulty.

In the foregoing, reference is made to aspects presented in this disclosure. However, the scope of the present disclosure is not limited to specific described aspects. Instead, any combination of the recited features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the recited aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects described herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of at least one aspect, a user may access applications or related data available in the cloud. For example, the abnormal operation module 105 could execute on a computing system in the cloud and define the subset of parameters and associated thresholds in the thresholds 113. Doing so allows a user or application to access this information from any computing system attached to a network connected to the cloud (e.g., the Internet).

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects, other and further aspects described herein may be devised without departing from the basic scope thereof, and the scope thereof is determined by the claims that follow.

What is claimed is:

1. A method, comprising:
   identifying from a plurality of maintenance messages (MMSGs) a threshold value indicating abnormal operations of a shut-off valve;
   capturing, during a first predefined time period after the shut-off valve is opened, a first plurality of sensor readings related to the shut-off valve;
   capturing, during a second predefined time period after the shut-off valve is closed, a second plurality of sensor readings related to the shut-off valve;
   identifying a first maximum value from the first plurality of sensor readings and a second maximum value from the second plurality of sensor readings; and
   in response to determining that a difference between the first maximum value and the second maximum value satisfies the threshold value, generating an alert indicating that the shut-off valve is operating abnormally.

2. The method of claim 1, further comprising:
   transmitting, while a vehicle in which the shut-off valve is included is operating, the alert to a remote computing device via a network; and
   scheduling, by the remote computing device, maintenance for the shut-off valve.

3. The method of claim 1, wherein identifying the threshold value from the plurality of MMSGs further comprises:
   identifying, in each MMSG of the plurality of MMSGs, a first plurality of MMSG sensor readings related to a respective shut-off valve that were captured during a first MMSG predefined time period after opening the respective shut-off valve;
   identifying, in each MMSG of the plurality of MMSGs, a second plurality of MMSG sensor readings related to the respective shut-off valve that were captured during a second MMSG predefined time period after closing the respective shut-off valve;
   identifying, for each MMSG of the plurality of MMSGs, a first MMSG maximum value from the first plurality of MMSG sensor readings and a second MMSG maximum value from the second plurality of MMSG sensor readings;
   computing, for each MMSG of the plurality of MMSGs, a MMSG difference between the first MMSG maximum value and the second MMSG maximum value, to produce a corresponding plurality of MMSG differences;
   identifying a value from the plurality of MMSG differences that is a specified number of standard deviations from a mean of the plurality of MMSG differences; and
   setting the value to the threshold.

4. The method of claim 1, wherein the plurality of MMSGs are identified based on a determination that a respective date of each MMSG of the plurality of MMSGs occurred within a specified number of days from a current date at which the first plurality of sensor readings and the second plurality of sensor readings are captured.

5. The method of claim 1, wherein the first predefined time period lasts for a given window of time during a given operational phase of a vehicle in which the shut-off valve is included and the second predefined time period lasts for the given window of time during the given operational phase of the vehicle.

6. The method of claim 1, further comprising:
   identifying from the plurality of MMSGs a second threshold value indicating abnormal operations of the shut-off valve;
   capturing, during the first predefined time period after the shut-off valve is opened, a third plurality of sensor readings related to the shut-off valve;
   capturing, during the second predefined time period after the shut-off valve is closed, a fourth plurality of sensor readings related to the shut-off valve;
   wherein the first plurality of sensor readings and the second plurality of sensor readings relate to a first parameter of the shut-off valve and the third plurality of sensor readings and the fourth plurality of sensor readings relate to a second parameter of the shut-off valve different from the first parameter;

17 identifying a third maximum value from the third plurality of sensor readings and a fourth maximum value from the fourth plurality of sensor readings; and in response to determining that a second difference between the third maximum value and the fourth maximum value satisfies the second threshold value, generating the alert indicating that the shut-off valve is operating abnormally.

7. The method of claim 6, wherein the first parameter and the second parameter are selected from the group consisting of:
temperature;
pressure;
altitude;
airspeed; and
humidity.

8. A system, comprising:
a processor; and
a memory containing a program which when executed by the processor performs an operation comprising:
identifying from a plurality of maintenance messages (MMSGs) a threshold value indicating abnormal operations of a shut-off valve;
capturing, during a first predefined time period after the shut-off valve is opened, a first plurality of sensor readings related to the shut-off valve;
capturing, during a second predefined time period after the shut-off valve is closed, a second plurality of sensor readings related to the shut-off valve;
identifying a first maximum value from the first plurality of sensor readings and a second maximum value from the second plurality of sensor readings; and
in response to determining that a difference between the first maximum value and the second maximum value satisfies the threshold value, generating an alert indicating that the shut-off valve is operating abnormally.

9. The system of claim 8, the operation further comprising:
transmitting, while a vehicle in which the shut-off valve is included is operating, the alert to a remote computing device via a network; and
scheduling, by the remote computing device, maintenance for the shut-off valve.

10. The system of claim 8, wherein identifying the threshold value from the plurality of MMSGs further comprises:
identifying, in each MMSG of the plurality of MMSGs, a first plurality of MMSG sensor readings related to a respective shut-off valve that were captured during a first MMSG predefined time period after opening the respective shut-off valve;
identifying, in each MMSG of the plurality of MMSGs, a second plurality of MMSG sensor readings related to the respective shut-off valve that were captured during a second MMSG predefined time period after closing the respective shut-off valve;
identifying, for each MMSG of the plurality of MMSGs, a first MMSG maximum value from the first plurality of MMSG sensor readings and a second MMSG maximum value from the second plurality of MMSG sensor readings;
computing, for each MMSG of the plurality of MMSGs, a MMSG difference between the first MMSG maximum value and the second MMSG maximum value, to produce a corresponding plurality of MMSG differences;

18 identifying a value from the plurality of MMSG differences that is a specified number of standard deviations from a mean of the plurality of MMSG differences; and
setting the value to the threshold.

11. The system of claim 8, wherein the plurality of MMSGs are identified based on a determination that a respective date of each MMSG of the plurality of MMSGs occurred within a specified number of days from a current date at which the first plurality of sensor readings and the second plurality of sensor readings are captured.

12. The system of claim 8, wherein the first predefined time period lasts for a given window of time during a given operational phase of a vehicle in which the shut-off valve is included and the second predefined time period lasts for the given window of time during the given operational phase of the vehicle.

13. The system of claim 8, the operation further comprising:
identifying from the plurality of MMSGs a second threshold value indicating abnormal operations of the shut-off valve;
capturing, during the first predefined time period after the shut-off valve is opened, a third plurality of sensor readings related to the shut-off valve;
capturing, during the second predefined time period after the shut-off valve is closed, a fourth plurality of sensor readings related to the shut-off valve;
wherein the first plurality of sensor readings and the second plurality of sensor readings relate to a first parameter of the shut-off valve and the third plurality of sensor readings and the fourth plurality of sensor readings relate to a second parameter of the shut-off valve different from the first parameter;
identifying a third maximum value from the third plurality of sensor readings and a fourth maximum value from the fourth plurality of sensor readings; and
in response to determining that a second difference between the third maximum value and the fourth maximum value satisfies the second threshold value, generating the alert indicating that the shut-off valve is operating abnormally.

14. The system of claim 13, wherein the first parameter and the second parameter are selected from the group consisting of:
temperature;
pressure;
altitude;
airspeed; and
humidity.

15. A computer readable storage device including instructions that when executed by a processor enables the processor to perform an operation comprising:
identifying from a plurality of maintenance messages (MMSGs) a threshold value indicating abnormal operations of a shut-off valve;
capturing, during a first predefined time period after the shut-off valve is opened, a first plurality of sensor readings related to the shut-off valve;
capturing, during a second predefined time period after the shut-off valve is closed, a second plurality of sensor readings related to the shut-off valve;
identifying a first maximum value from the first plurality of sensor readings and a second maximum value from the second plurality of sensor readings; and
in response to determining that a difference between the first maximum value and the second maximum value satisfies the threshold value, generating an alert indicating that the shut-off valve is operating abnormally.

16. The storage device of claim 15, the operation further comprising:
transmitting, while a vehicle in which the shut-off valve is included is operating, the alert to a remote computing device via a network; and
scheduling, by the remote computing device, maintenance for the shut-off valve.

17. The storage device of claim 15, wherein identifying the threshold value from the plurality of MMSGs further comprises:
identifying, in each MMSG of the plurality of MMSGs, a first plurality of MMSG sensor readings related to a respective shut-off valve that were captured during a first MMSG predefined time period after opening the respective shut-off valve;
identifying, in each MMSG of the plurality of MMSGs, a second plurality of MMSG sensor readings related to the respective shut-off valve that were captured during a second MMSG predefined time period after closing the respective shut-off valve;
identifying, for each MMSG of the plurality of MMSGs, a first MMSG maximum value from the first plurality of MMSG sensor readings and a second MMSG maximum value from the second plurality of MMSG sensor readings;
computing, for each MMSG of the plurality of MMSGs, a MMSG difference between the first MMSG maximum value and the second MMSG maximum value, to produce a corresponding plurality of MMSG differences;
identifying a value from the plurality of MMSG differences that is a specified number of standard deviations from a mean of the plurality of MMSG differences; and
setting the value to the threshold.

18. The storage device of claim 15, wherein the plurality of MMSGs are identified based on a determination that a respective date of each MMSG of the plurality of MMSGs occurred within a specified number of days from a current date at which the first plurality of sensor readings and the second plurality of sensor readings are captured.

19. The storage device of claim 15, wherein the first predefined time period lasts for a given window of time during a given operational phase of a vehicle in which the shut-off valve is included and the second predefined time period lasts for the given window of time during the given operational phase of the vehicle.

20. The storage device of claim 15, the operation further comprising:
identifying from the plurality of MMSGs a second threshold value indicating abnormal operations of the shut-off valve;
capturing, during the first predefined time period after the shut-off valve is opened, a third plurality of sensor readings related to the shut-off valve;
capturing, during the second predefined time period after the shut-off valve is closed, a fourth plurality of sensor readings related to the shut-off valve;
wherein the first plurality of sensor readings and the second plurality of sensor readings relate to a first parameter of the shut-off valve and the third plurality of sensor readings and the fourth plurality of sensor readings relate to a second parameter of the shut-off valve different from the first parameter, wherein the first parameter and the second parameter are selected as different members from the group consisting of:
temperature;
pressure;
altitude;
airspeed; and
humidity;
identifying a third maximum value from the third plurality of sensor readings and a fourth maximum value from the fourth plurality of sensor readings; and
in response to determining that a second difference between the third maximum value and the fourth maximum value satisfies the second threshold value, generating the alert indicating that the shut-off valve is operating abnormally.

* * * * *